(12) United States Patent
Hsu et al.

(10) Patent No.: US 8,300,427 B2
(45) Date of Patent: Oct. 30, 2012

(54) POWER CONVERSION APPARATUS AND OVER CURRENT PROTECTION METHOD THEREOF

(75) Inventors: Chih-Hsiung Hsu, Hsinchu (TW); Ju-Lin Chia, Hsinchu (TW)

(73) Assignee: Power Forest Technology Corporation, Hsinchu (TW)

( * ) Notice: Subject to any disclaimer, the term of this patent is extended or adjusted under 35 U.S.C. 154(b) by 306 days.

(21) Appl. No.: 12/846,837

(22) Filed: Jul. 30, 2010

(65) Prior Publication Data
US 2012/0008342 A1    Jan. 12, 2012

(30) Foreign Application Priority Data
Jul. 6, 2010    (TW) .............................. 99122177 A (51) Int. Cl.
*H02M 3/335*    (2006.01)
*H02M 3/24*    (2006.01)
(52) U.S. Cl. ... 363/21.01; 363/20; 363/21.1; 363/21.18; 363/56.1; 363/97
(58) Field of Classification Search ............... 363/20, 363/21.01, 21.04, 21.09, 21.1, 21.11, 21.12, 363/21.17, 21.18, 95, 97, 56.09, 56.1
See application file for complete search history.

(56) References Cited

U.S. PATENT DOCUMENTS

| | | | |
|---|---|---|---|
| 6,256,210 B1 * | 7/2001 | Strijker et al. | 363/21.04 |
| 6,788,556 B2 * | 9/2004 | Hosotani et al. | 363/21.15 |
| 7,889,521 B2 * | 2/2011 | Hsu | 363/21.14 |
| 2003/0048645 A1 * | 3/2003 | Hosotani et al. | 363/21.12 |
| 2004/0223277 A1 * | 11/2004 | Cheng et al. | 361/100 |
| 2008/0067993 A1 * | 3/2008 | Coleman | 323/282 |
| 2010/0085781 A1 * | 4/2010 | Saji et al. | 363/21.16 |

* cited by examiner

*Primary Examiner* — Bao Q Vu
(74) *Attorney, Agent, or Firm* — Jianq Chyun IP Office (57) ABSTRACT

A power conversion apparatus and an over current protection (OCP) method thereof are provided. The OCP method includes generating a pulse-width-modulation (PWM) signal according to a loading status of an electronic device, so as to switch a power switch in the power conversion apparatus and thus making the power conversion apparatus providing an output voltage to the electronic device; generating an OCP reference signal with variable slope according to a feedback signal related to the loading status of the electronic device and a system operation voltage of a PWM controller chip in the power conversion apparatus that is used for generating the PWM signal; and comparing a sensing voltage corresponding to a current following through the power switch on a resistor, and the OCP reference signal with variable slope to determine whether to activate an OCP mechanism to control the PWM controller chip whether to generate the PWM signal.

9 Claims, 5 Drawing Sheets

| | |
|---|---|
| Generating a pulse width modulation signal according to a loading status of an electronic device, so as to switch a power switch in the power conversion apparatus and thus make the power conversion apparatus to provide an output voltage to the electronic device | S601 |
| Generating an over current protection reference signal with variable slope according to a feedback signal related to the loading status of the electronic device and a system operation voltage of a pulse width modulation controller chip in the power conversion apparatus that is used for generating the pulse width modulation signal | S603 |
| Comparing a sensing voltage corresponding to a current following through the power switch on a resistor to the over current protection reference signal with variable slope so as to determine whether or not to activate an over current protection mechanism to control the pulse width modulation controller chip whether or not to generate the pulse width modulation signal | S605 |

FIG. 6

POWER CONVERSION APPARATUS AND OVER CURRENT PROTECTION METHOD THEREOF

CROSS-REFERENCE TO RELATED APPLICATION

This application claims the priority benefit of Taiwan application serial no. 99122177, filed on Jul. 6, 2010. The entirety of the above-mentioned patent application is hereby incorporated by reference herein and made a part of this specification.

BACKGROUND

1. Field of the Invention

The invention relates to a power conversion apparatus, more particularly, to a power conversion apparatus using an over current protection reference signal with variable slope to determine whether or not to activate an over current protection mechanism.

2. Description of Related Art

A main application of a power conversion apparatus is to convert an alternating current (AC) input voltage with high voltage and low stability that is provided by a power company into a direct current (DC) output voltage with low voltage and high stability that is adapted to various electronic devices. Therefore, the power conversion apparatus is widely used in electronic devices such as computers, office automation equipments, industrial control equipments and communication devices, etc.

Figure 1:
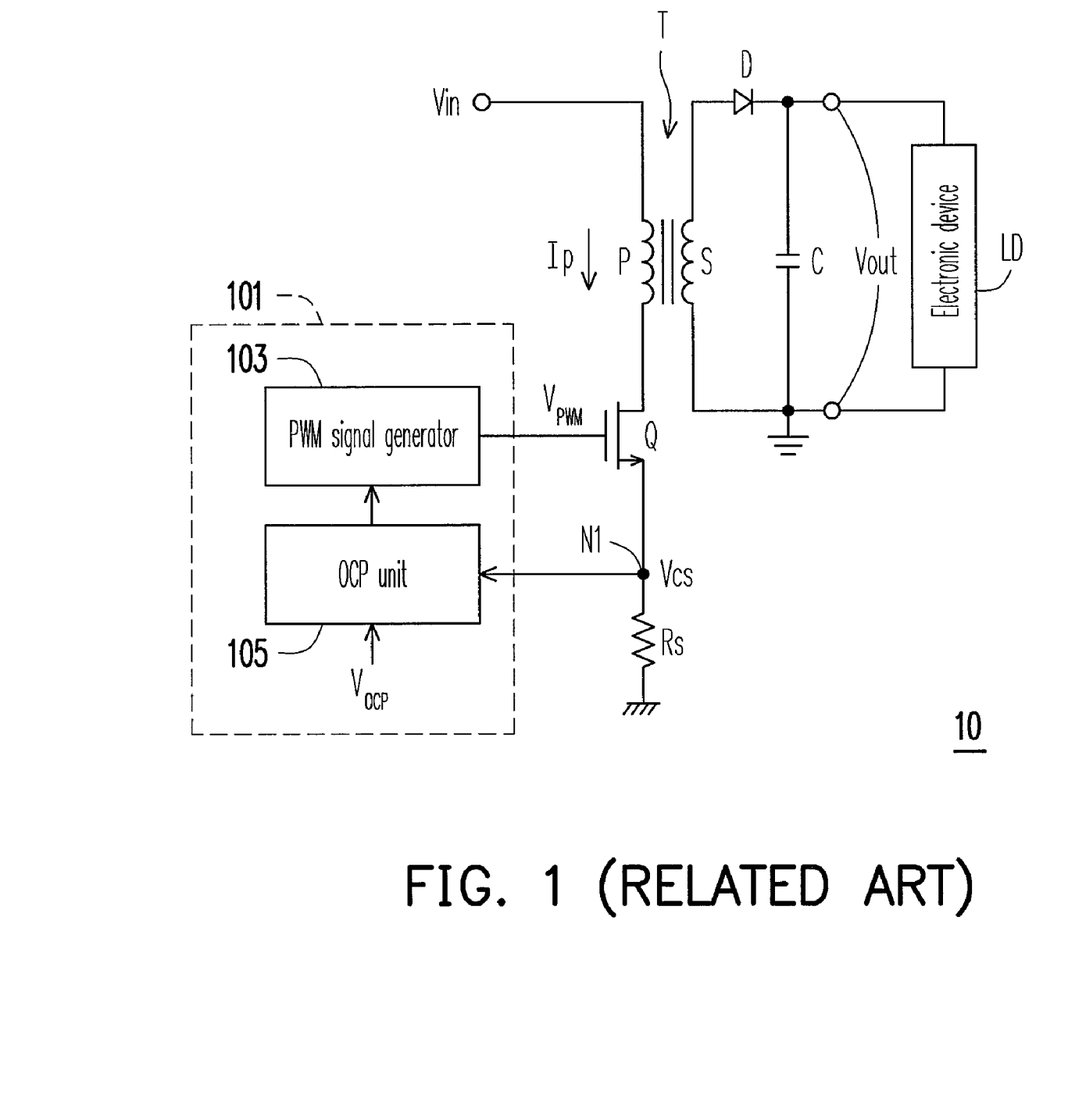
FIG. 1 is a schematic diagram illustrating a conventional power conversion apparatus 10.

FIG. 1 is a schematic diagram illustrating a conventional power conversion apparatus 10. Referring to FIG. 1, generally, a pulse width modulation (PWM) signal generator 103 in a PWM controller chip 101 outputs a PWM signal $V_{PWM}$ to switch (i.e. turn on/off) a power switch Q. In this way, an AC voltage of a secondary side S of a transformer T corresponding to an AC input voltage Vin received by the primary side P of the transformer T (the AC voltage is determined by a turn ratio of the primary and the secondary sides P and S of the transformer T) is rectified by a diode D and filtered by a capacitor C, and is converted into a DC output voltage Vout and provided to an electronic device LD for utilization.

Conventionally, to avoid excessive current Ip (i.e. over current) flowing through the primary side P of the transformer T to cause damage/burnout of the power switch Q and/or the electronic device LD, in the power conversion apparatus 10, an over current protection (OCP) unit 105 in the PWM controller chip 101 is used to detect a voltage Vcs on a node N1 between the power switch Q and a resistor Rs, wherein Vcs=Rs×Ip. When the voltage Vcs on the node N1 reaches a predetermined OCP reference voltage $V_{OCP}$ (which is generally a constant DC voltage) received by the OCP unit 105, the OCP unit 105 activates an OCP mechanism to control the PWM signal generator 103 not to output the PWM signal $V_{PWM}$, so as to turn off the power switch Q to protect the power switch Q and/or the electronic device LD.

However, the power conversion apparatus 10 is generally applied in wide range AC input occasions (for example, the AC input voltage of 90V-264V). Therefore, in case of an idle state that the input power Pin of the power conversion apparatus 10 is equal to an output power Pout thereof (Pin=Pout), since the predetermined OCP reference voltage $V_{OCP}$ received by the OCP unit 105 is a constant DC voltage, energies of over outputs caused by the OCP mechanism activated by the OCP unit 105 are different in case that the power conversion apparatus 10 receives the lowest AC input voltage Vin (90V) and the highest AC input voltage Vin (264V), so that OCP points corresponding to the OCP mechanism activated by the OCP unit 105 are different in case that the power conversion apparatus 10 receives the lowest AC input voltage 90V and the highest AC input voltage 264V.

Figure 2:
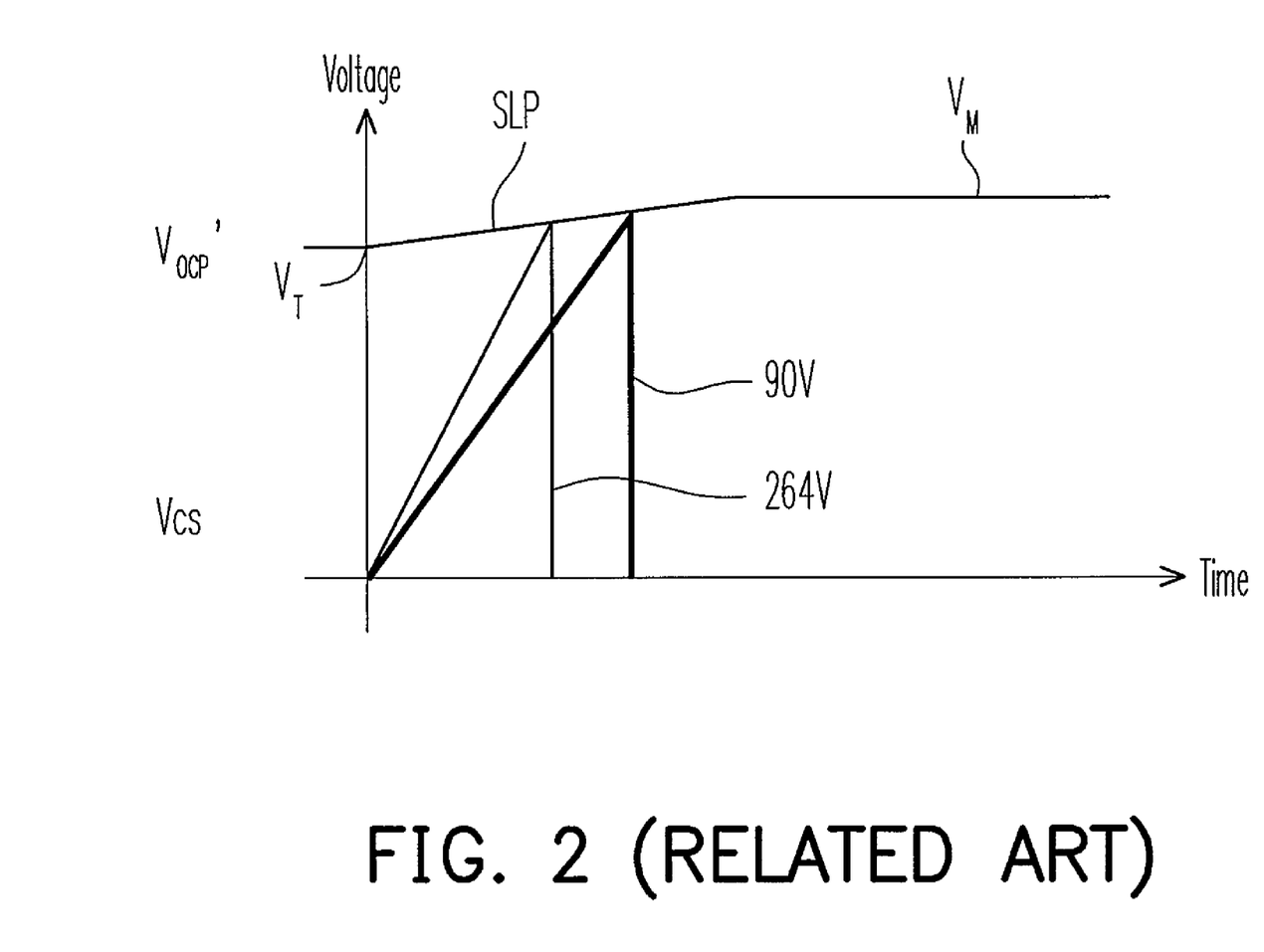
FIG. 2 is a schematic diagram of a compensated OCP reference voltage $V_{OCP}'$ and a voltage Vcs on a node N1 in conventional.

To effectively resolve the problem that the OCP points corresponding to the OCP mechanism activated by the OCP unit 105 are different in case that the power conversion apparatus 10 receives the lowest AC input voltage 90V and the highest AC input voltage 264V, conventionally, the predetermined OCP reference voltage $V_{OCP}$ of the constant DC voltage received by the OCP unit 105 can be compensated to a compensated OCP reference voltage $V_{OCP}'$ having a fixed initial voltage $V_T$ climbing to a highest voltage $V_M$ along a fixed slope SLP, as that shown in FIG. 2. In this way, the difference of the OCP points corresponding to the OCP mechanism activated by the OCP unit 105 in case that the power conversion apparatus 10 receives the lowest AC input voltage 90V and the highest AC input voltage 264V can be effectively reduced.

However, if the slope SLP is too flat, the difference of the OCP points corresponding to the OCP mechanism activated by the OCP unit 105 in case that the power conversion apparatus 10 receives the lowest AC input voltage 90V and the highest AC input voltage 264V cannot be effectively reduced. On the other hand, if the slope SLP is too steep, although the difference of the OCP points corresponding to the OCP mechanism activated by the OCP unit 105 in case that the power conversion apparatus 10 receives the lowest AC input voltage 90V and the highest AC input voltage 264V can be effectively reduced, since the slope SLP is steeped, in case of maintaining the highest voltage $V_M$ of the compensated OCP reference voltage $V_{OCP}'$, the initial voltage $V_T$ of the compensated OCP reference voltage $V_{OCP}'$ has to be pulled down.

In this way, the OCP unit 105 may intermittently activate/trigger the OCP mechanism at an initial stage of booting the electronic device LD when the power conversion apparatus 10 receives the lowest AC input voltage 90V to provide the DC output voltage Vout to the electronic device LD, so that the electronic device LD cannot be successfully booted since now the voltage Vcs of the node N1 is easy to reach the pulled-down initial voltage $V_T$.

SUMMARY

Accordingly, the invention is directed to a power conversion apparatus using an over current protection reference signal with variable slope to determine whether or not to activate an over current protection mechanism, and an over current protection method thereof, which can resolve the problem mentioned in the related art.

The invention provides a power conversion apparatus including a transformer, a power switch, a first resistor, a feedback unit and a pulse width modulation (PWM) controller chip. The transformer has a primary side and a secondary side. A first end of the primary side of the transformer receives an input voltage, and the secondary side of the transformer provides an output voltage to an electronic device. A first end of the power switch is coupled to a second end of the primary side of the transformer, a second end of the power switch is coupled to a first node, and a control end of the power switch receives a PWM signal.

The first resistor is coupled between the first node and a ground potential. The feedback unit is coupled to the secondary side of the transformer, and is used for receiving the output voltage, and accordingly outputting a feedback signal related to a loading status of the electronic device. The PWM controller chip is coupled to the control end of the power switch, the first node and the feedback unit, and is used for generating an OCP reference signal with variable slope according to the feedback signal and a system operation voltage of the PWM controller chip, and accordingly comparing a voltage of the first node and the OCP reference signal with variable slope to determine whether or not to generate the PWM signal to switch the power switch.

The invention provides an OCP method of a power conversion apparatus. The method can be described as follows. A PWM signal is generated according to a loading status of an electronic device, so as to switch a power switch in the power conversion apparatus and thus make the power conversion apparatus to provide an output voltage to the electronic device. An OCP reference signal with variable slope is generated according to a feedback signal related to the loading status of the electronic device and a system operation voltage of a PWM controller chip in the power conversion apparatus that is used for generating the PWM signal. A sensing voltage corresponding to a current following through the power switch on a resistor is compared to the OCP reference signal with variable slope so as to determine whether or not to activate an OCP mechanism to control the PWM controller chip whether or not to generate the PWM signal.

In an embodiment of the invention, when booting of the electronic device is not completed, an initial voltage of the OCP reference signal with variable slope is a first predetermined voltage, and a slope of the OCP reference signal with variable slope is a first predetermined slope, and a highest voltage of the OCP reference signal with variable slope is a second predetermined voltage.

In an embodiment of the invention, when booting of the electronic device is completed, an initial voltage of the OCP reference signal with variable slope is a third predetermined voltage, and a slope of the OCP reference signal with variable slope is a second predetermined slope, and the highest voltage of the OCP reference signal with variable slope is still the second predetermined voltage.

In an embodiment of the invention, the second predetermined slope is greater than the first predetermined slope, the first predetermined voltage is greater than the third predetermined voltage, and the second predetermined voltage is greater than the first and the third predetermined voltages.

According to the power conversion apparatus and the OCP method thereof disclosed by the invention, the OCP reference signal with variable slope is used to determine whether or not to activate the OCP mechanism of the OCP unit. Once booting of the electronic device is not completed, the OCP reference signal with variable slope having relative high initial voltage climbing to the highest voltage along a relative small slope is provided to the OCP unit. In this way, the OCP unit is less likely to intermittently activate/trigger the OCP mechanism at an initial stage of booting the electronic device LD when the power conversion apparatus receives the lowest input voltage (90V) to provide the DC output voltage to the electronic device, so that the electronic device can be successfully booted.

On the other hand, once booting of the electronic device is completed, the OCP reference signal with variable slope having relative low initial voltage climbing to the highest voltage along a relative great slope is provided to the OCP unit. In this way, the difference of the OCP points corresponding to the OCP mechanism activated by the OCP unit in case that the power conversion apparatus receives the lowest AC input voltage (90V) and the highest AC input voltage (264V) can be effectively reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
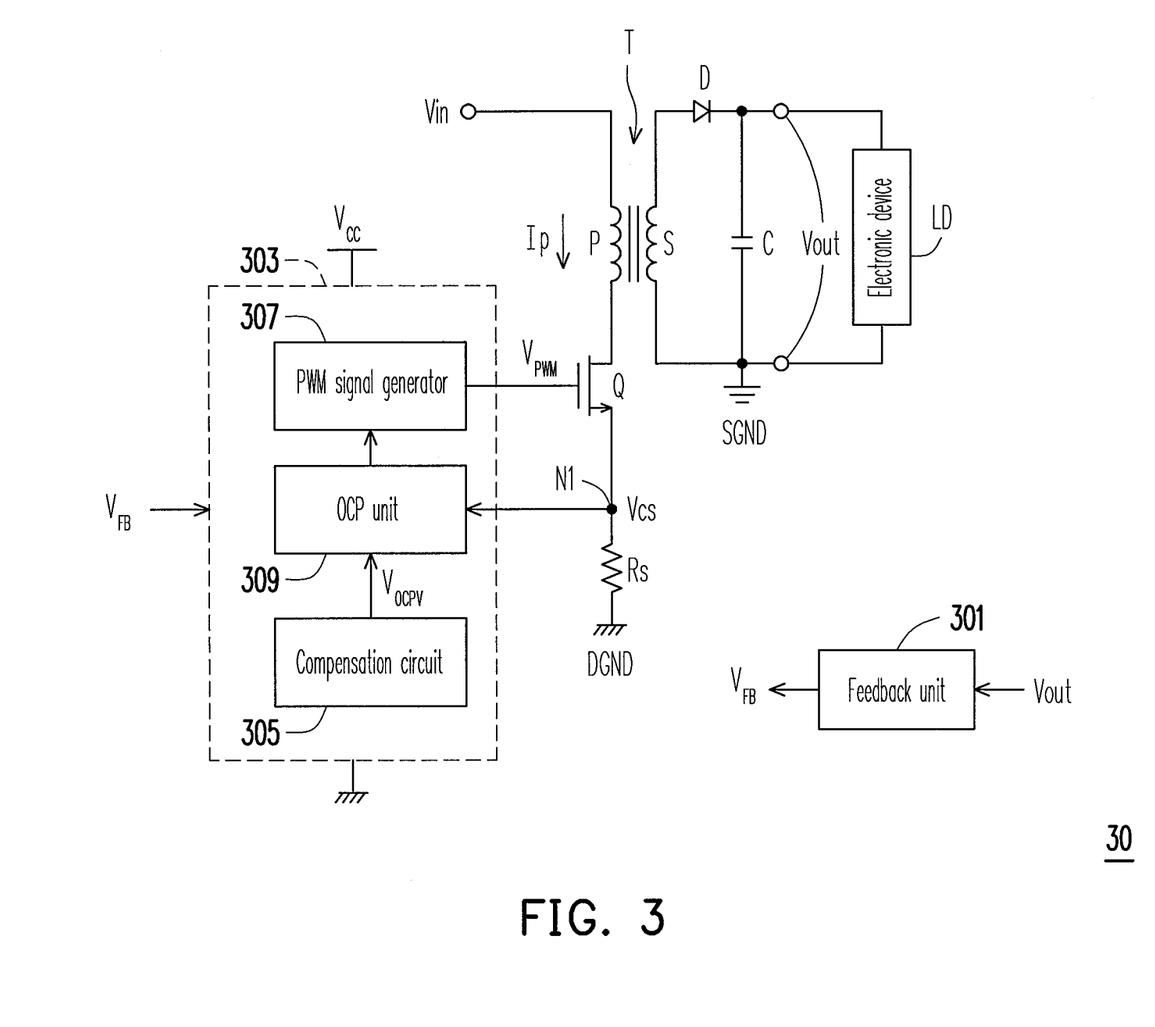
FIG. 3 is a schematic diagram illustrating a power conversion apparatus 30 according to an embodiment of the invention.

FIG. 3 is a schematic diagram illustrating a power conversion apparatus 30 according to an embodiment of the invention. Referring to FIG. 3, the power conversion apparatus 30 can be applied to wide range alternating current (AC) input occasions, for example, an AC input voltage of 90V-264V, though the invention is not limited thereto. The power conversion apparatus 30 includes a transformer T, a power switch Q, a resistor Rs, a feedback unit 301, a pulse width modulation (PWM) controller chip 303, a diode D and a capacitor C.

In the present embodiment, the transformer T has a primary side P and a secondary side S. A first end of the primary side P of the transformer T is used for receiving an input voltage Vin, and the second side S of the transformer T is used for providing an output voltage Vout to an electronic device LD.

Generally, the input voltage Vin is an AC input voltage. Therefore, an AC voltage of the secondary side S of the transformer T corresponding to the AC input voltage Vin received by the primary side P of the transformer T (the AC voltage is determined by a turn ratio of the primary and the secondary sides P and S of the transformer T) has to be rectified by the diode D and filtered by the capacitor C for converting into the DC output voltage Vout required by the electronic device LD. Generally, an anode of the diode D is coupled to a first end of the secondary side S of the transformer T, and a cathode of the diode D is coupled to the electronic device LD. Moreover, a first end of the capacitor C is coupled to the cathode of the diode D, and a second end of the capacitor C is coupled to a second end of the secondary side S of the transformer T and a ground potential SGND, i.e. safety ground.

In the present embodiment, a first end of the power switch Q (for example, an N-type transistor) is coupled to a second end of the primary side P of the transformer T, a second end of the power switch Q is coupled to a node N1, and a control end of the power switch Q is used for receiving a PWM signal $V_{PWM}$. The resistor Rs is coupled between the node N1 and a ground potential DGND, i.e. dangerous ground. The feedback unit 301 is coupled to the secondary side S of the transformer T, and is used for receiving the DC output voltage Vout, and accordingly outputting a feedback signal $V_{FB}$ related to a loading status of the electronic device LD.

It should be noticed that any circuit type (topology) (for example, a feedback circuit using a resistor divider and an optical coupler) capable of outputting a feedback signal related to the loading status of the electronic device LD can be used as the feedback unit 301 of the present embodiment, so that implementation of the feedback unit 301 is not limited by the present embodiment.

The PWM controller chip 303 is coupled to the control end of the power switch Q, the node N1 and the feedback unit 301, and is used for generating an over current protection (OCP) reference signal with variable slope $V_{OCPV}$ according to the feedback signal $V_{FB}$ output by the feedback unit 301 and a system operation voltage $V_{CC}$ of the PWM controller chip 303, and accordingly comparing a voltage Vcs on the first node N1 and the OCP reference signal with variable slope $V_{OCPV}$ to determine whether or not to generate the PWM signal $V_{PWM}$ to switch (i.e. turn on/off) the power switch Q.

In detail, the PWM controller chip 303 includes a compensation circuit 305, a PWM signal generator 307 and an OCP unit 309, wherein the compensation circuit 305 is coupled to the feedback unit 301, and is used for receiving the system operation voltage $V_{CC}$ of the PWM controller chip 303 and the feedback signal $V_{FB}$ of the feedback unit 301, and accordingly generating the OCP reference signal with variable slope $V_{OCPV}$.

The PWM signal generator 307 is coupled to the control end of the power switch Q, and is used for generating and adjusting the PWM signal $V_{PWM}$ according to the feedback signal $V_{FB}$ output by the feedback unit 301. The OCP unit 309 is coupled to the node N1, the compensation circuit 305 and the PWM signal generator 307, and is used for receiving and comparing the voltage Vcs on the node N1 and the OCP reference signal with variable slope $V_{OCPV}$ generated by the compensation circuit 305, so as to determine whether or not to activate an OCP mechanism to control the PWM signal generator 307 whether or not to generate the PWM signal $V_{PWM}$. Therefore, excessive current Ip (i.e. over current) flowing through the primary side P of the transformer T that probably damages/burns the power switch Q and/or the electronic device LD can be avoided.

Reviewing the content disclosed by the related art of the invention and referring to FIG. 1 and FIG. 2, in case of an idle state that the input power Pin of the power conversion apparatus 10 is equal to the output power Pout thereof (Pin=Pout), since the predetermined OCP reference voltage $V_{OCP}$ received by the OCP unit 105 is generally a constant DC voltage, energies of over outputs caused by the OCP mechanism activated by the OCP unit 105 are different in case that the power conversion apparatus 10 receives the lowest AC input voltage Vin (90V) and the highest AC input voltage Vin (264V), so that OCP points corresponding to the OCP mechanism activated by the OCP unit 105 are different in case that the power conversion apparatus 10 receives the lowest AC input voltage 90V and the highest AC input voltage 264V.

To effectively resolve the problem that the OCP points corresponding to the OCP mechanism activated by the OCP unit 105 are different in case that the power conversion apparatus 10 receives the lowest AC input voltage 90V and the highest AC input voltage 264V, conventionally, the predetermined OCP reference voltage $V_{OCP}$ of the constant DC voltage received by the OCP unit 105 can be compensated to a compensated OCP reference voltage $V_{OCP}'$ having a fixed initial voltage $V_T$ climbing to a highest voltage $V_M$ along a fixed slope SLP. In this way, the difference of the OCP points corresponding to the OCP mechanism activated by the OCP unit 105 in case that the power conversion apparatus 10 receives the lowest AC input voltage 90V and the highest AC input voltage 264V can be effectively reduced.

However, if the slope SLP is too flat, the difference of the OCP points corresponding to the OCP mechanism activated by the OCP unit 105 in case that the power conversion apparatus 10 receives the lowest AC input voltage 90V and the highest AC input voltage 264V cannot be effectively reduced. On the other hand, if the slope SLP is too steep, although the difference of the OCP points corresponding to the OCP mechanism activated by the OCP unit 105 in case that the power conversion apparatus 10 receives the lowest AC input voltage 90V and the highest AC input voltage 264V can be effectively reduced, since the slope SLP is steeped, in case of maintaining the highest voltage $V_M$ of the compensated OCP reference voltage $V_{OCP}'$, the initial voltage $V_T$ of the compensated OCP reference voltage $V_{OCP}'$ has to be pulled down.

Therefore, the OCP unit 105 may intermittently activate/trigger the OCP mechanism at an initial stage of booting the electronic device LD when the power conversion apparatus 10 receives the lowest AC input voltage 90V to provide the DC output voltage Vout to the electronic device LD, so that the electronic device LD cannot be successfully booted since now the voltage Vcs of the node N1 is easy to reach the pulled-down initial voltage $V_T$.

Therefore, in the present embodiment, the compensation circuit 305 is used to generate the OCP reference signal with variable slope $V_{OCPV}$ to the OCP unit 309, so as to effectively resolve the problem mentioned in the related art. It should be noticed that the OCP reference signal with variable slope $V_{OCPV}$ generated by the compensation circuit 305 is neither the predetermined OCP reference voltage $V_{OCP}$ of the constant DC voltage nor the compensated OCP reference voltage $V_{OCP}'$ having the fixed initial voltage $V_T$ climbing to the highest voltage $V_M$ along the fixed slope SLP.

Figure 4:
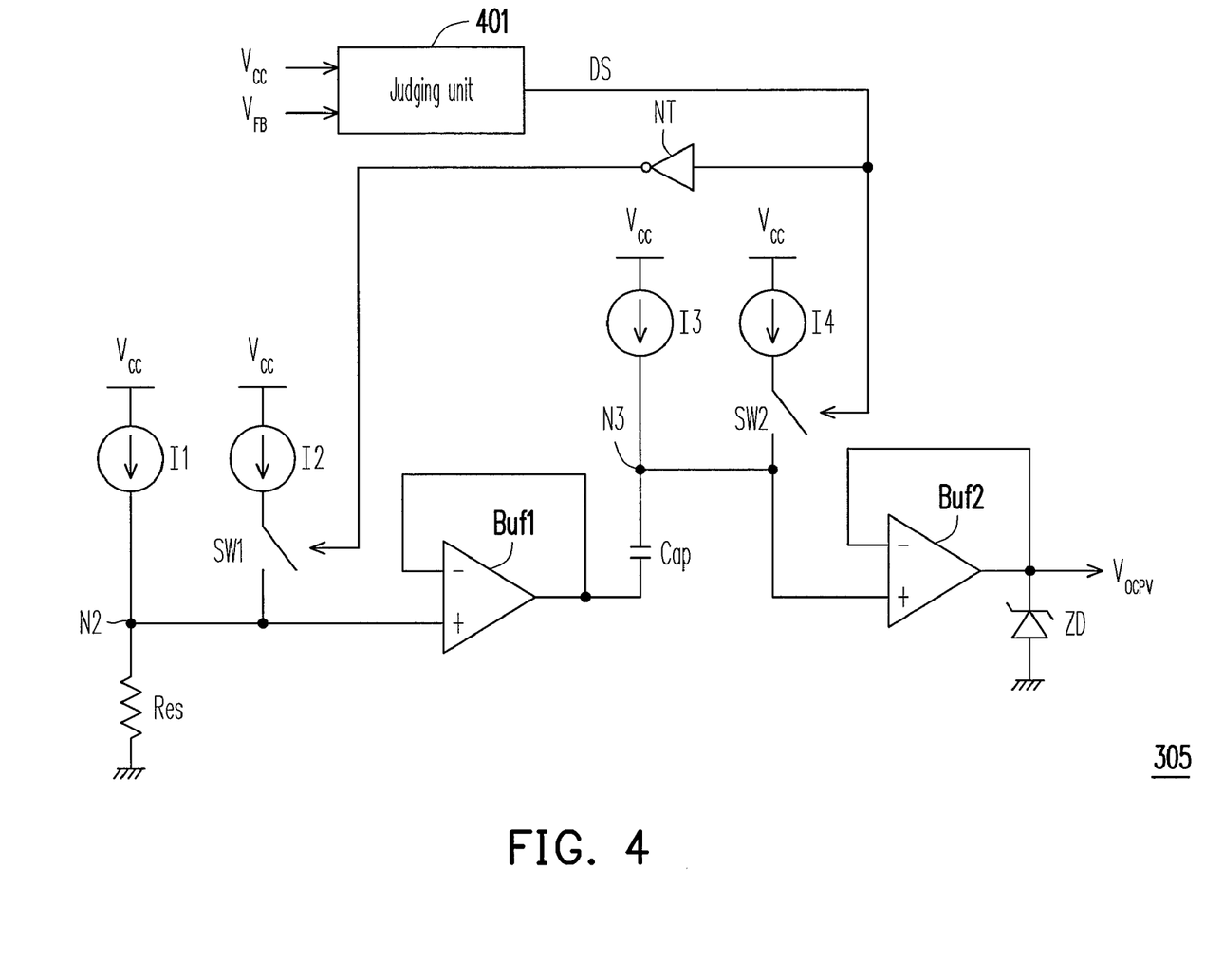
FIG. 4 is a schematic diagram illustrating a compensation circuit 305 according to an embodiment of the invention.

In detail, FIG. 4 is a schematic diagram illustrating the compensation circuit 305 according to an embodiment of the invention. Referring to FIG. 3 and FIG. 4, the compensation circuit 305 includes a judging unit 401, current sources I1-I4, a resistor Res, switches SW1 and SW2, buffers Buf1 and Buf2, a Zener diode ZD and an inverter NT. In the present embodiment, the judging unit 401 is used for receiving the system operation voltage $V_{CC}$ of the PWM controller chip 303 and the feedback signal $V_{FB}$ output by the feedback unit 301, and accordingly judging whether booting of the electronic device LD is completed, so as to output a judging signal DS.

In the present embodiment, if the judging unit 401 judges that booting of the electronic device LD is not completed, the judging unit 401 outputs the judging signal DS with a logic low potential. Conversely, if the judging unit 401 judges that booting of the electronic device LD is completed, the judging unit 401 outputs the judging signal DS with a logic high potential, though it can be adaptively changed according to an actual design requirement.

The current source I1 and the resistor Res are connected in series between the system operation voltage $V_{CC}$ of the PWM controller chip 303 and the ground potential DGND. The current source 12 and the switch SW1 are connected in series between the system operation voltage $V_{CC}$ of the PWM controller chip 303 and a node N2 between the current source I1 and the resistor Res. An input terminal of the buffer Buf1 is coupled to the node N2. The current source I3 and a capacitor Cap are connected in series between the system operation voltage $V_{CC}$ of the PWM controller chip 303 and an output terminal of the buffer Buf1.

The current source I4 and the switch SW2 are connected in series between the system operation voltage $V_{CC}$ of the PWM controller chip 303 and a node N3 between the current source I3 and the capacitor Cap. An input terminal of the buffer Buf2 is coupled to the node N3, and an output terminal of the buffer Buf2 outputs the OCP reference signal with variable slope $V_{OCPV}$. An anode of the Zener diode ZD is coupled to the ground potential DGND, and a cathode of the Zener diode ZD is coupled to the output terminal of the buffer Buf2. An input terminal of the inverter NT receives the judging signal DS of the judging unit 401, and is coupled to a control end of the switch SW2, and an output terminal of the inverter NT is coupled to a control end of the switch SW1.

Figure 5:
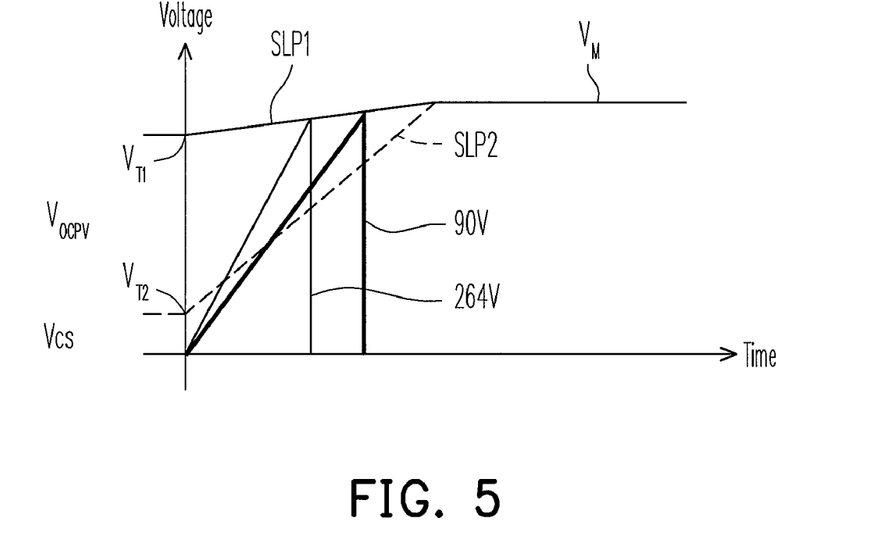
FIG. 5 is a schematic diagram of an OCP reference voltage with variable slope $V_{OCPV}$ and a voltage Vcs on a node N1 according to an embodiment of the invention.

In the present embodiment, as shown in FIG. 5, when booting of the electronic device LD is not completed, an initial voltage $V_{T1}$ of the OCP reference signal with variable slope $V_{OCPV}$ is a first predetermined voltage (which is determined according to an actual design requirement), and a slope SLP1 of the OCP reference signal with variable slope $V_{OCPV}$ is a first predetermined slope (which is determined according to an actual design requirement), and a highest voltage $V_M$ of the OCP reference signal with variable slope $V_{OCPV}$ is a second predetermined voltage (which is determined according to an actual design requirement).

Conversely, when booting of the electronic device LD is completed, an initial voltage $V_{T2}$ of the OCP reference signal with variable slope $V_{OCPV}$ is a third predetermined voltage (which is determined according to an actual design requirement), and a slope SLP2 of the OCP reference signal with variable slope $V_{OCPV}$ is a second predetermined slope (which is determined according to an actual design requirement), and the highest voltage $V_M$ of the OCP reference signal with variable slope $V_{OCPV}$ is still the second predetermined voltage. In the present embodiment, the second predetermined slope is greater than the first predetermined slope, the first predetermined voltage is greater than the third predetermined voltage, and the second predetermined voltage is greater than the first and the third predetermined voltages.

Moreover, when booting of the electronic device LD is not completed, the switch SW1 is turned on in response to an output of the inverter NT, and the switch SW2 is turned off in response to an input of the inverter NT. Conversely, when booting of the electronic device LD is completed, the switch SW1 is turned off in response to the output of the inverter NT, and the switch SW2 is turned on in response to the input of the inverter NT.

In detail, when booting of the electronic device LD is not completed, the judging signal DS output by the judging unit 401 has the logic low potential, so that the switches SW1 and SW2 are respectively turned on and turned off, and therefore the OCP reference signal with variable slope $V_{OCPV}$ climbs from the voltage on the node N2 (i.e. $V_{T1}$=(I1+I2)*Res) to the highest voltage $V_M$ (i.e. a voltage clamped by the Zener diode ZD, and a specification of the Zener diode ZD can be determined according to an actual design requirement) according to a charging rate (i.e. the slope SLP1) determined by the current source I3 and the capacitor Cap.

On the other hand, when booting of the electronic device LD is completed, the judging signal DS output by the judging unit 401 has the logic high potential, so that the switches SW1 and SW2 are respectively turned off and turned on, and therefore the OCP reference signal with variable slope $V_{OCPV}$ climbs from the voltage on the node N2 (i.e. $V_{T2}$=I1*Res) to the highest voltage $V_M$ according to a charging rate (i.e. the slope SLP2) determined by the current sources I3 and I4(I3+I4) and the capacitor Cap.

Accordingly, it can be known that once booting of the electronic device LD is not completed, the compensation circuit 305 would provide the OCP reference signal with variable slope $V_{OCPV}$ having relative high initial voltage $V_{T1}$ climbing to the highest voltage $V_M$ along the relative small slope SLP1 to the OCP unit 309. In this way, the OCP unit 309 is less likely to intermittently activate/trigger the OCP mechanism at the initial stage of booting the electronic device LD when the power conversion apparatus 30 receives the lowest input voltage (90V) to provide the DC output voltage to the electronic device LD, so that the electronic device LD can be successfully booted since now the voltage Vcs of the node N1 is not easy to reach the initial voltage $V_{T1}$.

On the other hand, once booting of the electronic device is completed, the compensation circuit 305 would provide the OCP reference signal with variable slope $V_{OCPV}$ having relative low initial voltage $V_{T2}$ climbing to the highest voltage $V_M$ along a relative great slope SLP2 to the OCP unit 309. In this way, the difference of the OCP points corresponding to the OCP mechanism activated by the OCP unit 309 in case that the power conversion apparatus 30 receives the lowest AC input voltage (90V) and the highest AC input voltage (264V) can be effectively reduced.

According to the above disclosure, an OCP method of the power conversion apparatus is deduced below for those skilled in the art.

Figure 6:
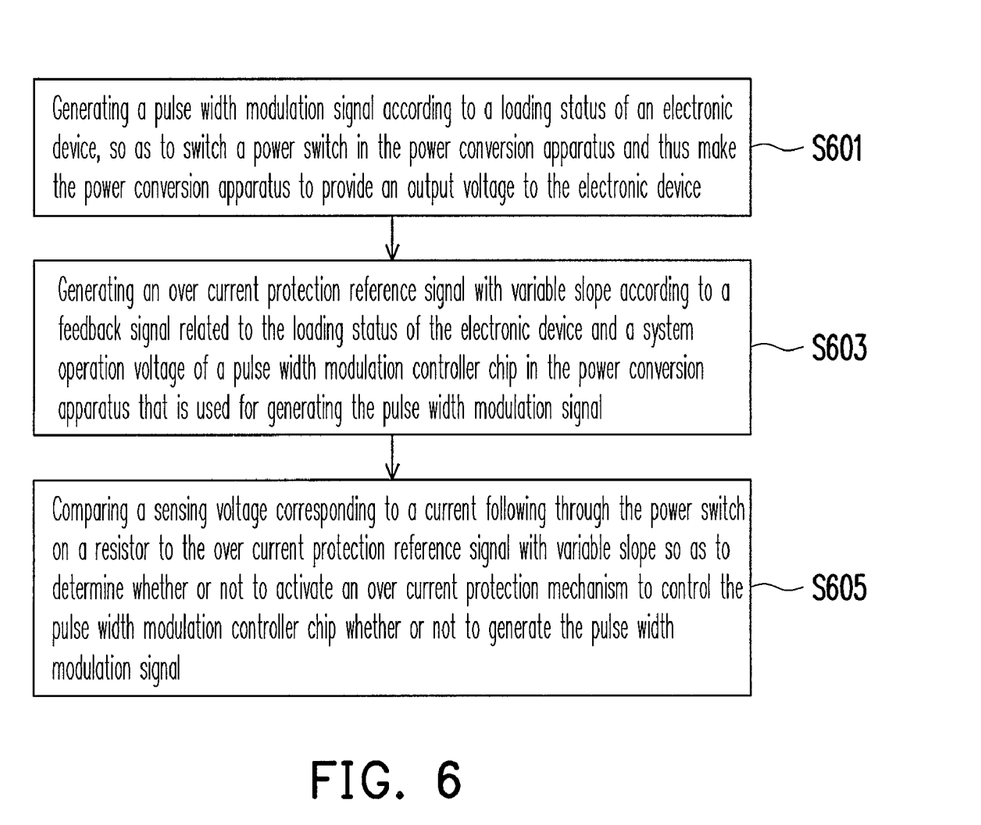
FIG. 6 is a flowchart illustrating an OCP method of a power conversion apparatus according to an embodiment of the invention.

FIG. 6 is a flowchart illustrating an OCP method of a power conversion apparatus according to an embodiment of the invention. Referring to FIG. 6, the OCP method of the power conversion apparatus includes following steps. A PWM signal is generated according to a loading status of an electronic device, so as to switch a power switch in the power conversion apparatus and thus make the power conversion apparatus to provide an output voltage to the electronic device (step S601). An OCP reference signal with variable slope is generated according to a feedback signal related to the loading status of the electronic device and a system operation voltage of a PWM controller chip in the power conversion apparatus that is used for generating the PWM signal (step S603). A sensing voltage corresponding to a current following through the power switch on a resistor is compared to the OCP reference signal with variable slope so as to determine whether or not to activate an OCP mechanism to control the PWM controller chip whether or not to generate the PWM signal (step S605).

In the step S603, the step of generating the OCP reference signal with variable slope includes determining whether booting of the electronic device is completed according to the system operation voltage of the PWM controller chip and the feedback signal related to the loading status of the electronic device, so as to determine an initial voltage, a slope and a highest voltage of the OCP reference signal with variable slope.

In the present embodiment, when booting of the electronic device is not completed, the initial voltage of the OCP reference signal with variable slope is a first predetermined voltage, and the slope of the OCP reference signal with variable slope is a first predetermined slope, and the highest voltage of the OCP reference signal with variable slope is a second predetermined voltage. Conversely, when booting of the electronic device is completed, the initial voltage of the OCP reference signal with variable slope is a third predetermined voltage, and the slope of the OCP reference signal with variable slope is a second predetermined slope, and the highest voltage of the OCP reference signal with variable slope is still the second predetermined voltage. Wherein, the second predetermined slope is greater than the first predetermined slope, the first predetermined voltage is greater than the third predetermined voltage, and the second predetermined voltage is greater than the first and the third predetermined voltages.

In summary, according to the power conversion apparatus and the OCP method thereof disclosed by the invention, the OCP reference signal with variable slope is used to determine whether or not to activate the OCP mechanism of the OCP unit. Once booting of the electronic device is not completed, the OCP reference signal with variable slope having relative high initial voltage climbing to the highest voltage along a relative small slope is provided to the OCP unit. In this way, the OCP unit is less likely to intermittently activate/trigger the OCP mechanism at an initial stage of booting the electronic device LD when the power conversion apparatus receives the lowest input voltage (90V) to provide the DC output voltage to the electronic device, so that the electronic device can be successfully booted.

On the other hand, once the booting of the electronic device is completed, the OCP reference signal with variable slope having relative low initial voltage climbing to the highest voltage along a relative great slope is provided to the OCP unit. In this way, the difference of the OCP points corresponding to the OCP mechanism activated by the OCP unit in case that the power conversion apparatus receives the lowest AC input voltage (90V) and the highest AC input voltage (264V) can be effectively reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power conversion apparatus, comprising:
    a transformer, having a primary side and a secondary side, wherein a first end of the primary side receives an input voltage, and the secondary side provides an output voltage to an electronic device;
    a power switch, having a first end coupled to a second end of the primary side, a second end coupled to a first node, and a control end receiving a pulse width modulation signal;
    a first resistor, coupled between the first node and a ground potential;
    a feedback unit, coupled to the secondary side, for receiving the output voltage, and accordingly outputting a feedback signal related to a loading status of the electronic device; and
    a pulse width modulation controller chip, coupled to the control end of the power switch, the first node and the feedback unit, for generating an over current protection reference signal with variable slope according to the feedback signal and a system operation voltage of the pulse width modulation controller chip, and accordingly comparing a voltage of the first node and the over current protection reference signal with variable slope to determine whether or not to generate the pulse width modulation signal to switch the power switch.

2. The power conversion apparatus as claimed in claim 1, wherein the pulse width modulation controller chip comprises:
    a compensation circuit, coupled to the feedback unit, for receiving the system operation voltage and the feedback signal, and accordingly generating the over current protection reference signal with variable slope;
    a pulse width modulation signal generator, coupled to the control end of the power switch, for generating and adjusting the pulse width modulation signal according to the feedback signal; and
    an over current protection unit, coupled to the first node, the compensation circuit and the pulse width modulation signal generator, for receiving and comparing the voltage of the first node and the over current protection reference signal with variable slope, so as to determine whether or not to activate an over current protection mechanism to control the pulse width modulation controller chip whether or not to generate the pulse width modulation signal.

3. The power conversion apparatus as claimed in claim 2, wherein the compensation circuit comprises:
    a judging unit, for receiving the system operation voltage and the feedback signal, and accordingly judging whether booting of the electronic device is completed, so as to output a judging signal;
    a first current source;
    a second resistor, wherein the first current source and the second resistor are connected in series between the system operation voltage and the ground potential;
    a second current source;
    a first switch, wherein the second current source and the first switch are connected in series between the system operation voltage and a second node between the first current source and the second resistor;
    a first buffer, having an input terminal coupled to the second node;
    a third current source;
    a first capacitor, wherein the third current source and the first capacitor are connected in series between the system operation voltage and an output terminal of the first buffer;
    a fourth current source;
    a second switch, wherein the fourth current source and the second switch are connected in series between the system operation voltage and a third node between the third current source and the first capacitor;
    a second buffer, having an input terminal coupled to the third node, and an output terminal outputting the over current protection reference signal with variable slope;
    a Zener diode, having an anode coupled to the ground potential, and a cathode coupled to the output terminal of the second buffer; and
    an inverter, having an input terminal receiving the judging signal and coupled to a control end of the second switch, and an output terminal coupled to a control end of the first switch.

4. The power conversion apparatus as claimed in claim 3, wherein
    when booting of the electronic device is not completed, the first switch is turned on in response to an output of the inverter, and the second switch is turned off in response to an input of the inverter; and
    when booting of the electronic device is completed, the first switch is turned off in response to the output of the inverter, and the second switch is turned on in response to the input of the inverter.

5. The power conversion apparatus as claimed in claim 1, wherein
- when booting of the electronic device is not completed, an initial voltage of the over current protection reference signal with variable slope is a first predetermined voltage, a slope of the over current protection reference signal with variable slope is a first predetermined slope, and a highest voltage of the over current protection reference signal with variable slope is a second predetermined voltage; and
- when booting of the electronic device is completed, an initial voltage of the over current protection reference signal with variable slope is a third predetermined voltage, a slope of the over current protection reference signal with variable slope is a second predetermined slope, and a highest voltage of the over current protection reference signal with variable slope is the second predetermined voltage,
- wherein the second predetermined slope is greater than the first predetermined slope, the first predetermined voltage is greater than the third predetermined voltage, and the second predetermined voltage is greater than the first and the third predetermined voltages.

6. The power conversion apparatus as claimed in claim 1, wherein the power switch is an N-type transistor.

7. An over current protection method, adapted to a power conversion apparatus, the over current protection method comprising:
- generating a pulse width modulation signal according to a loading status of an electronic device, so as to switch a power switch in the power conversion apparatus and thus make the power conversion apparatus to provide an output voltage to the electronic device;
- generating an over current protection reference signal with variable slope according to a feedback signal related to the loading status of the electronic device and a system operation voltage of a pulse width modulation controller chip in the power conversion apparatus that is used for generating the pulse width modulation signal; and
- comparing a sensing voltage corresponding to a current following through the power switch on a resistor to the over current protection reference signal with variable slope so as to determine whether or not to activate an over current protection mechanism to control the pulse width modulation controller chip whether or not to generate the pulse width modulation signal.

8. The over current protection method as claimed in claim 7, wherein the step of generating the over current protection reference signal with variable slope comprises:
- determining whether booting of the electronic device is completed according to the system operation voltage and the feedback signal, so as to determine an initial voltage, a slope and a highest voltage of the over current protection reference signal with variable slope.

9. The over current protection method as claimed in claim 8, wherein
- when booting of the electronic device is not completed, an initial voltage of the over current protection reference signal with variable slope is a first predetermined voltage, a slope of the over current protection reference signal with variable slope is a first predetermined slope, and a highest voltage of the over current protection reference signal with variable slope is a second predetermined voltage; and
- when booting of the electronic device is completed, an initial voltage of the over current protection reference signal with variable slope is a third predetermined voltage, a slope of the over current protection reference signal with variable slope is a second predetermined slope, and a highest voltage of the over current protection reference signal with variable slope is the second predetermined voltage,
- wherein the second predetermined slope is greater than the first predetermined slope, the first predetermined voltage is greater than the third predetermined voltage, and the second predetermined voltage is greater than the first and the third predetermined voltages.

* * * * *